United States Patent
Rodriguez et al.

(10) Patent No.: US 10,550,232 B2
(45) Date of Patent: Feb. 4, 2020

(54) THIN FILM BARRIER COATING FOR CFRP

(71) Applicants: University of Surrey, Guilford, Surrey (GB); AIRBUS DS GMBH, Taufkirchen (DE)

(72) Inventors: Jose Virgilio Anguita Rodriguez, Hook (GB); Ravi Silva, Camberly (GB); Ian Hamerton, Fleet (GB); Winnie Tang, Slough (GB); Thomas Theo Stute, Bermatingen (DE)

(73) Assignees: University of Surrey, Surrey (GB); Airbus Defence and Space GMBH, Taufkirchen (DE)

( * ) Notice: Subject to any disclaimer, the term of this patent is extended or adjusted under 35 U.S.C. 154(b) by 663 days.

(21) Appl. No.: 14/775,902

(22) PCT Filed: Mar. 7, 2014

(86) PCT No.: PCT/GB2014/050674
§ 371 (c)(1),
(2) Date: Sep. 14, 2015

(87) PCT Pub. No.: WO2014/140535
PCT Pub. Date: Sep. 18, 2014

(65) Prior Publication Data
US 2016/0009876 A1 Jan. 14, 2016

(30) Foreign Application Priority Data
Mar. 7, 2014 (GB) .................................. 1304611.5

(51) Int. Cl.
| | | |
|---|---|---|
| C08J 5/04 | (2006.01) | |
| C09D 165/04 | (2006.01) | |
| B32B 27/38 | (2006.01) | |
| B32B 27/28 | (2006.01) | |
| C08J 7/04 | (2006.01) | |
| B32B 5/00 | (2006.01) | |

(52) U.S. Cl.
CPC .............. *C08J 5/042* (2013.01); *C08J 7/045* (2013.01); *C09D 165/04* (2013.01); *B32B 5/00* (2013.01); *B32B 27/28* (2013.01); *B32B 27/38* (2013.01); *B32B 2262/106* (2013.01); *B32B 2355/00* (2013.01); *B32B 2363/00* (2013.01); *C08G 2261/3424* (2013.01); *C08J 2363/02* (2013.01); *C08J 2465/04* (2013.01); *Y10T 428/31511* (2015.04); *Y10T 428/31931* (2015.04)

(58) Field of Classification Search
CPC .......... B32B 2262/106; B32B 2363/00; B32B 27/28; B32B 27/38; B32B 2355/00; B32B 5/00; C08G 2261/3424; C08J 2363/00; C08J 2363/02; C08J 2465/04; C08J 5/042; C08J 7/045; C09D 165/04; Y10T 428/31511; Y10T 428/31931
See application file for complete search history.

(56) References Cited

U.S. PATENT DOCUMENTS

| | | | |
|---|---|---|---|
| 4,961,994 A * | 10/1990 | Cariou ..................... | B64G 1/54 428/408 |
| 5,863,480 A * | 1/1999 | Suwanda ................ | B29C 55/26 264/209.8 |
| 2006/0020060 A1* | 1/2006 | Uchiyama .............. | B82Y 30/00 524/100 |
| 2006/0166003 A1* | 7/2006 | Khabashesku ......... | B82Y 30/00 428/413 |
| 2011/0160384 A1* | 6/2011 | Shimazu ................. | C08L 67/02 524/539 |
| 2013/0214214 A1* | 8/2013 | Carnahan ................. | H01B 1/24 252/511 |
| 2014/0030510 A1* | 1/2014 | Kimura ................... | C23C 14/10 428/336 |

FOREIGN PATENT DOCUMENTS

| | | | | |
|---|---|---|---|---|
| CN | 1730744 A | * | 2/2006 | |
| EP | 1938970 A1 | | 7/2008 | |
| GB | 2213168 | | 8/1989 | |
| JP | S6193404 | | 5/1986 | |
| JP | 1-238929 A | | 9/1989 | |
| JP | 5-136441 A | | 6/1993 | |
| JP | 5-270500 A | | 10/1993 | |
| JP | H10-150887 A | | 6/1998 | |
| JP | 11-58587 A | | 3/1999 | |
| JP | H11-145284 A | | 5/1999 | |
| JP | 11-245327 A | | 9/1999 | |
| JP | 2005-76099 A | | 3/2005 | |
| JP | 2005-125764 A | | 5/2005 | |
| JP | 2009-204121 A | | 9/2009 | |
| JP | 2010-032298 A | | 2/2010 | |
| JP | 2013-516337 A | | 5/2013 | |
| WO | WO-2012133687 A1 | * | 10/2012 | ............. C23C 14/10 |

OTHER PUBLICATIONS

DeArmitt, Phantom Plastics™ Polyhedral Oligomeric Silsesquioxane Handbook, Version 1.0 (Year: 2010).*
Machine translation of CN 1730744 (Year: 2006).*
Abdel A. Abusafieh et al., "Dimensional stability of CFRP composites for space-based reflectors," Proceedings of SPIE, vol. 4444, Nov. 5, 2001, XP055127312.
Hassan Mahfuz et al., "Coating of Carbon Fiber with Polyhedral Oligomeric Silsesquioxane (POSS) to Enhance Mechanical Properties and Durability of Carbon/Ninyl Ester Composites," Materials, vol. 4, No. 12, Sep. 21, 2011, pp. 1619-1631, XP055136403.

(Continued)

*Primary Examiner* — John D Freeman
(74) *Attorney, Agent, or Firm* — FisherBroyles, LLP; Robert Kinberg (57) ABSTRACT

An article comprises a carbon fibre reinforced plastic (CFRP) substrate, a buffer layer disposed adjacent the substrate, the buffer layer comprising a poly(para-xylylene) polymer; and a moisture barrier coating disposed adjacent the buffer layer.

13 Claims, 5 Drawing Sheets

(56) References Cited

OTHER PUBLICATIONS

Kostopoulos V et al., "Carbon nanotube epoxy-modified CFRPs: Towards improved mechanical and sensing for multifunctional aerostructures," Proceedings of SPIE, S P I E—International Society for Optical Engineering, US, vol. 6929, Mar. 10, 2008, pp. 69292M-1, XP003028159.
International Search Report of PCT/GB2014/050674 dated Sep. 1, 2014.
Written Opinion of the International Searching Authority of PCT/GB2014/050674.
Properties of Amorphous Carbon, Issue 29 of EMIS Datareviews Series, Editor S.R.P. Silva, 2003, ISBN 0852969619, 9780852969618.
Japanese Office Action for related JP Application No. 2015-562296, dated Jan. 24, 2018, and English translation thereof.
Archambault et al., "Metallization of carbon fibre reinforced polymer composite by cold spray and lay-up molding processes", Surface and Coatings Technology 300 (2016), pp. 78-86.
Lackner et al., "Roughness Influence on Marco-and Micro-Tribology of multi-layers Hard Coatings on Carbon Fibre Polymer Composite", Archives of Metallurgy and Materials, vol. 60, Issue 3, 2015, pp. 2145-2151.
Robert Schoenberger, "Painting carbon fiber. A time-consuming, labor-intensive task" Today's Motor Vehicle (TMV), Jul. 22, 2014, http://www.todaysmotorvehicles.com/article/tmv0714-painting-carbon-fiber-challenges/.
Decision to Grant a Patent in Japanese Patent Application No. 2015-562296 dated Jun. 12, 2018.

* cited by examiner

The surface of CFRP is anisotropic. It has VERY DIFFERENT mechanical properties along different directions:

Stretched and torn MBC

Aminopropylisobutyl POSS®      AM0265

C$_{31}$H$_{71}$NO$_{12}$Si$_8$    FW 874.58    D$_4^{20}$ 1.16    n$_D^{20}$ 1.49

| | |
|---|---|
| Solvent Solubility | THF, chloroform, hexane |
| Solvent Insolubility | acetonitrile, methanol |
| Resin Solubility | aliphatic resins, aliphatic and aromatic amines |
| Appearance | white powder |
| Uses | grafting agent, chain terminator, Refrigerate |

R = i-butyl

50g/$40    100g/$120

(g)

Epoxycyclohexylisobutyl POSS®      EP0402

C$_{36}$H$_{72}$O$_{13}$Si$_8$    FW 941.66    D$_4^{20}$ 1.17    n$_D^{20}$ 1.50

| | |
|---|---|
| Solvent Solubility | THF, chloroform, hexane |
| Solvent Insolubility | acetonitrile |
| Resin Solubility | aliphatic resins, aromatic amines |
| Appearance | white powder |
| Uses | impact modifier, hydrophobic epoxide grafting agent |

R = i-butyl

CAS [445379-56-6]    10g/$100    100g/$200

THIN FILM BARRIER COATING FOR CFRP

The present invention relates to carbon fibre reinforced plastics (CFRP), and in particular to modifications to CFRP's for improved performance of articles manufactured from such materials. The invention extends to methods of manufacturing CFRP's, and to various uses.

Figure 1A:
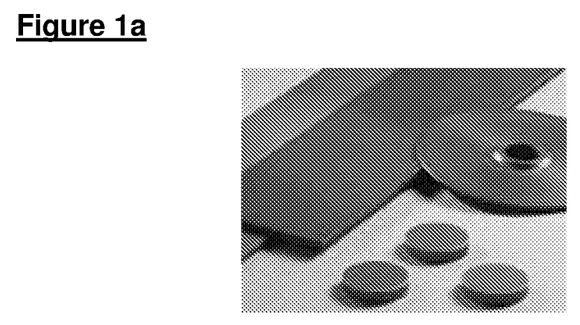
FIG. 1a is a photo of some CFRP objects.
Figure 1B:
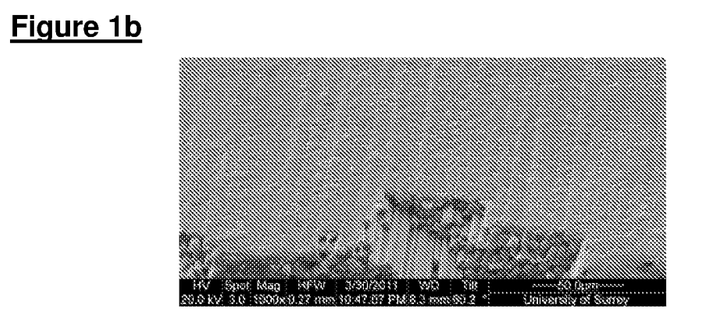
FIG. 1b shows the microstructure of a CFRP resin matrix showing fibres embedded therein.

Carbon fibre reinforced plastic or polymer (CFRP) composite is a generic term that describes a set of materials that are produced by embedding a large number of thin (i.e. a few micrometers in diameter) and long (i.e. many meters long) carbon fibres in a resin matrix. The resultant material is a resin matrix that is reinforced by the carbon fibres. CFRP is typically light and very strong, and is used in high-performance applications requiring strong yet light materials, such as in aerospace, or high-performance terrestrial transportation, or in high-precision systems such as telescopes or high-end sports equipment. FIGS. 1a and 1b show images of a CFRP material.

Different kinds of CFRP material arise by the fact that it is possible to use different types of resin, different types of fibre, and the fibres can be wound in different ways. However, the general principle of all CFRP materials is the same, i.e. the reinforcement of a resin matrix with strong carbon fibres. Other kinds of reinforcement include a fibrous, woven or particulate dispersion.

Despite the high strength and low density of CFRP, the material lacks performance in three key fields. Firstly, dimensional instability caused by moisture absorption and desorption into and out of the resin material, depending on the local environmental conditions. This causes the CFRP to swell up in a humid environment by picking up moisture, and to shrink in a dry environment releasing the moisture. This causes dimensional changes that occur randomly (i.e. outside the dimensional control of the manufacturers), and can render sophisticated equipment out use. This takes place when the dimensional changes are larger than the dimensional tolerance of the components. Secondly, CFRPs can suffer from low electrical conductivity (i.e. out-of-plane) as a result of the use of resins that are typically electrically insulating. Thirdly, CFRPs can suffer from low thermal conductivity (i.e. out-of-plane) as a result of the use of resins that typically have low thermally conductivity, i.e. conductivity values around 1 W/mK or less.

The problems of low electrical and thermal conductivity "out of plane" measurements means that the measurement is made perpendicular to the direction of travel of the fibres. For example, if the fibres run from North to South on a CFRP sample, the "in-plane" thermal and electrical conductivity measurements would be measured by applying a temperature gradient or potential difference across the North and South ends of the sample. Similarly, the "out-of-plane" measurements would be made by applying a temperature gradient or potential difference across the East to West ends of the sample, or the top-to-bottom sides of the sample. Typically, the in-plane electrical and thermal conductivities are both high (close to those of copper) as most of the transport is done by the fibres (these are mainly graphitic carbon). However, the out-of-plane measurements are low, and so electrically insulating, and thermal conductivity less than 1% of the in-plane conductivity values.

Consequently, there is a need to provide improved CFRP's, which exhibit dimensional stability (e.g. improved moisture behaviour) without jeopardizing the material's other mechanical properties, improved electrical conductivity and/or improved thermal conductivity.

Thus, in a first aspect, there is provided an article comprising:
(i) a carbon fibre reinforced plastic (CFRP) substrate,
(ii) a buffer layer disposed adjacent the substrate, and comprising a poly(para-xylylene) polymer; and
(iii) a moisture barrier coating disposed adjacent the buffer layer.

Figure 4:
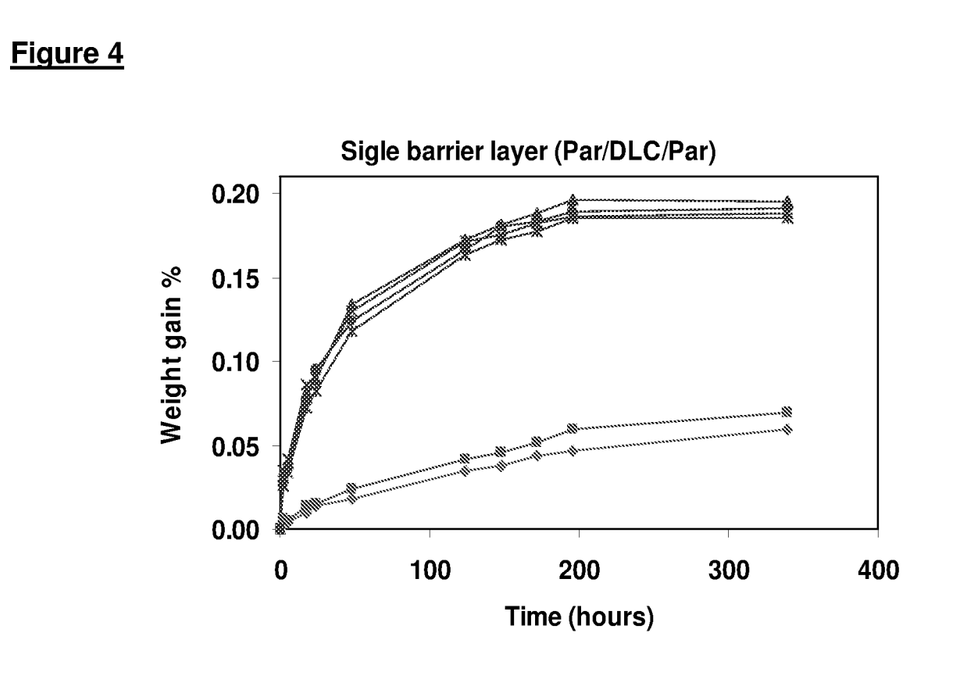
FIG. 4 is a graph showing the performance of moisture barrier coated (MBC) on CFRP (■ and ♦) exposed to 70° C. and 85% relative humidity (RH), compared to CFRP that is non-coated (▲, ● and ×)

Advantageously, as shown in FIG. 4, the CFRP article of the first aspect exhibits significantly improved water absorption characteristics, and therefore increased dimensional stability, due to the combination of the moisture barrier coating deposited on top of the poly(para-xylylene) buffer layer.

In a second aspect, there is provided a method of manufacturing an article comprising a carbon fibre reinforced plastic (CFRP), the method comprising:—
(i) providing a CFRP substrate;
(ii) depositing a buffer layer comprising a poly(para-xylylene) polymer on the substrate; and
(iii) depositing a moisture barrier coating on the buffer layer.

The moisture barrier coating (MBC) may be selected from a group of MBC's consisting of: diamond-like carbon; metal oxide; thin metal foil; and metal nitride. A suitable metal oxide, which may be used as the MBC, may be alumina, or silicon oxide. A suitable metal nitride may be aluminium nitride or silicon nitride.

Preferably, the moisture barrier coating comprises diamond-like carbon. The inventors believe that they are the first to show that diamond-like carbon can be effectively used as a moisture barrier coating on CFRP coating to reduce moisture absorption and desorption from an article, and to thereby prevent dimensional instability.

Hence, in a third aspect, there is provided an article comprising:
(i) a carbon fibre reinforced plastic (CFRP) substrate, and
(ii) a moisture barrier coating disposed adjacent the substrate, wherein the coating comprises diamond-like carbon.

In a fourth aspect, there is provided the use of diamond-like carbon as a moisture barrier coating for a carbon fibre reinforced plastic (CFRP).

In a fifth aspect, there is provided a method of manufacturing an article comprising a carbon fibre reinforced plastic (CFRP), the method comprising:—
(i) providing a CFRP substrate; and
(ii) depositing a moisture-barrier coating comprising diamond-like carbon on the substrate.

In an embodiment, the article of the third aspect may comprise a buffer layer disposed in between the substrate and the moisture-barrier coating, wherein the buffer comprises a poly(para-xylylene) polymer.

Poly(para-xylylene) polymers will be known to the skilled person, and may be represented by the formula I, as follows:— wherein R1, R2 and R3 are independently selected from a group consisting of Hydrogen or halogen, and wherein n is greater than 2, but typically 2500-5000.

The molecular weight of the poly(para-xylylene) polymer may be between about 500,000 g/mol, where the dimer (n=2) is processed to form a film of typical molecular weight of 500,000 g/mol (i.e. n~2500 to 5000 depending on monomer).

The poly(para-xylylene) polymer may be halogenated, for example it may comprise chlorine or fluorine. The poly(para-xylylene) polymer may be obtained from ParaTech coatings Ltd. (www.paratechcoating.co.uk). The poly(para-xylylene) polymer may be that which is sold under the trade name Parylene®, and may for example be Parylene N®, Parylene C®, Parylene HT® or Parylene D®. For Parylene N: R1=H, R2=H, R3=H; For Parylene C: R1=H, R2=Cl, R3=H; For Parylene D: R1=H, R2=Cl, R3=Cl; For Parylene HT: R1=F, R2=H, R3=H.

A preferred poly(para-xylylene) polymer comprises that which is sold under the trade name, Parylene D®. The inventors have shown that this buffer surprisingly stabilises the substrate prior to deposition of the moisture barrier coating, and especially diamond-like carbon.

The article of the first or third aspect may comprise more than one buffer layer comprising poly(para-xylylene) polymer. The thickness of the or each buffer layer may be about 0.1-1000 µm, or about 0.5-500 µm, or about 1-100 µm, or about 5-50 µm, or about 10-30 µm.

Example 2 describes the method by which the or each buffer layer comprising the poly(para-xylylene) polymer may be deposited onto the substrate of the CFRP article. The method preferably comprises initially cleaning the component, for example with isopropanol (IPA) alcohol. The method may comprise placing the CFRP article in a vacuum chamber, which may be evacuated to low pressure, for example to 1e-3 Torr. The method may comprise feeding a suitable adhesion promoter into the chamber. The adhesion promoter preferably forms a monolayer on the surface of the CFRP substrate, and improves adhesion of the buffer later to the substrate. For example, the adhesion promoter may comprise bis(trimethylsilyl)amine (also known as hexamethyldisilazane, or HMDS). Once the CFRP substrate has been contacted with adhesion promoter, the chamber may then be evacuated. The monomers that polymerise to form the buffer layer may then be fed into the chamber.

Figure 3:
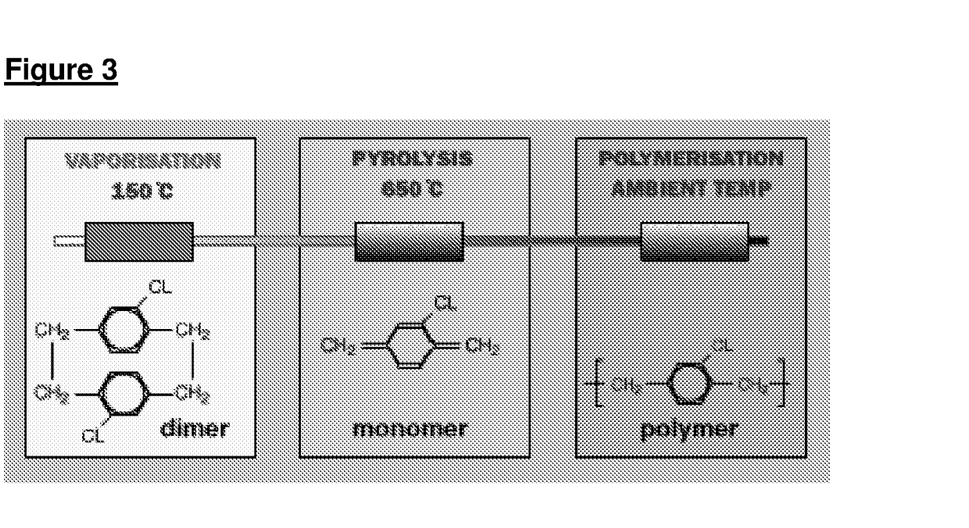
FIG. 3 is a schematic showing the parylene deposition process.

In an embodiment where the poly(para-xylylene) polymer comprises Parylene® (e.g. Parylene-D), monomer is preferably fed into the chamber. This may be achieved by initially heating Parylene dimer in a separate chamber, and then subjecting it to pyrolysis in a furnace, and then feeding the resultant Parylene monomers into the chamber where the CFRP article is disposed, as shown in FIG. 3. After coating with the buffer layer, the chamber may be vented, and the buffer-coated article may either be removed, or instead prepared for the deposition of the moisture barrier coating. The article may comprise more than one moisture barrier coating. The thickness of the or each MBC layer may be about 10 nm to 50 µm.

Example 2 describes how the or each MBC layer may be deposited on the buffer layer. For example, sputtering or physical vapour deposition (PVD) may be used. Preferably, however, the MBC may be deposited on to the buffer layer by a plasma-enhanced chemical vapour deposition (PECVD) process, which may involve the use of gas, which contacts exposed surfaces of the article to be coated.

The method may comprise evacuating the buffer-coated article, for example to 1e-3 Torr. The method may comprise feeding gas into the chamber. The gas may comprise a mixture of hydrogen and a hydrocarbon gas (e.g. methane, acetylene, etc). Typically, the hydrocarbon is diluted in the hydrogen to a concentration of around 1-20% (v/v), but it may be higher. Also, other gases such as argon, helium, nitrogen may be used in addition to the hydrocarbon. The method may comprise regulating the pressure of the chamber to pressures in the range of 50-1000 mTorr, or 100-200 mTorr.

The method may comprise creating a plasma in the chamber, for example by applying a radio-frequency (RF) electric signal to the CFRP article. The frequency of the signal may be operated at the radio-frequency frequency range, normally between 1 KHz to several hundred MHz, but about 13 or 13.56 MHz is preferred. A DC signal may also be used in conjunction with the RF signal, or on its own. The RF signal may be applied to the CFRP article via an RF matching unit. The plasma has the effect of growing a MBC (e.g. diamond-like carbon) layer on top of the buffer layer (e.g. parylene-D). After the desired thickness of 10 nm to 50 µm is reached, the RF signal is then switched off, the chamber purged and then vented so that the coated CFRP article may be removed.

The inventors believe that they are the first to ever deposit a buffer layer and a moisture barrier coating onto a CFRP article in a vacuum chamber. Advantageously, both layers can be deposited on the CFRP article in a single chamber, without breaking the vacuum. The inventors have demonstrated surprisingly efficient moisture barrier performance from CFRP components that have been coated with parylene/DLC structures using this method. It is also possible to multiply the performance of the barrier by depositing many buffer/MBC multilayers, and this can be achieved in a single process run using the method of the second aspect, which is a novel finding.

Figure 8:
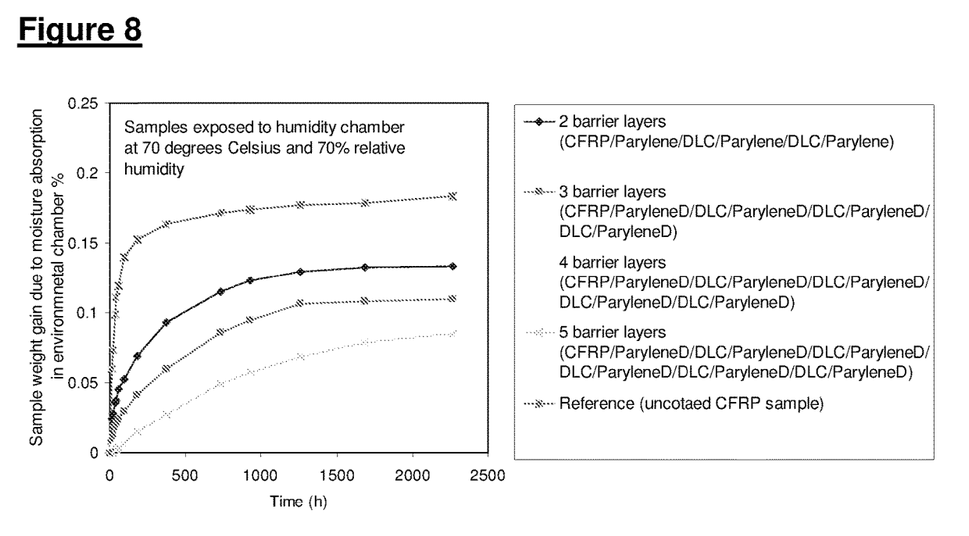
FIG. 8 is a graph showing the weight gain of dried samples placed in an environmental (humidity) chamber, set at 70° C. and 70% relative humidity, as a function of time.

For example, the article of the invention may comprise [BL:MBC]$_n$, wherein BL corresponds to the number of buffer layers (BL) and MBC corresponds to the number of moisture barrier coatings (MBC), and n is greater than 1. In some embodiments, n may be 2, 3, 4 or 5, or more, as illustrated in FIG. 8. In other embodiments, n may be at least 50, 100, 150, 200 or more. Preferably, the buffer layer and moisture barrier coatings are alternately disposed onto the substrate. For example, the article may comprise: (i) a substrate, (ii) BL (iii) MBC, (iv) BL, and (v) MBC, which would be represented by [BL:MBC]$_2$, or (i) a substrate, (ii) BL (iii) MBC, (iv) BL, (v) MBC, (vi) BL, and (vii) MBC, which would be represented by [BL:MBC]$_3$, and so on, depending on the required thickness. In this way, it is possible to "tune" the performance of the MBC layers on the substrate. In a preferred embodiment, the buffer layer comprises Parylene®, and the moisture barrier coating comprises diamond-like carbon.

Although the inventors found that the articles of the first and third aspect exhibit surprisingly improved water absorption/desorption characteristics, and therefore better dimensional stability, they experimented with adding various amounts of silsesquioxane to the polymeric resin making up the CFRP, to see if it affected water absorption and therefore the dimensional stability of the article. These experiments are described in Example 3. Surprisingly, the inventors found that addition of a small amount of silsesquioxane to the CFRP resin did significantly improve water absorption performance of the resultant CFRP. Furthermore, it was observed that as well as resulting in a much lower moisture uptake, the addition of silsesquioxane to the resin also lead to an increase in the thermal performance of the resins.

Differential scanning calorimetry (DSC) experiments were carried out, and the data are summarised in Table 1, which show the benefits of adding silsesquioxane into the polymeric matrix. These data show the varying glass transition temperatures ($T_g$) of the individual resins with the different concentrations of silsesquioxane. Even at low concentrations (i.e. only 0.5% wt) of silsesquioxane, the inventors observed a significant improvement in $T_g$ ranging from 23-47° C. compared to that of resin to which no silsesquioxane had been added, and this was totally unexpected.

Accordingly, the article of the invention, and preferably the polymeric resin thereof, may comprise silsesquioxane, or a derivative or analogue thereof. The silsesquioxane, or a derivative or analogue thereof may be represented by a general formula $(R—SiO_{1.5})_n$, wherein n is an even number, and R may be hydrogen, or a hydroxyl or alkoxy group, or an optionally substituted straight or branched alkyl, alkylene, aryl or arylene group, or an organofunctional derivative of any of these latter groups. A preferred silsesquioxane may comprise a polyhedral oligomeric silsesquioxane (POSS). POSS compounds may be obtained from Hybrid Plastics, USA.

Figure 5:
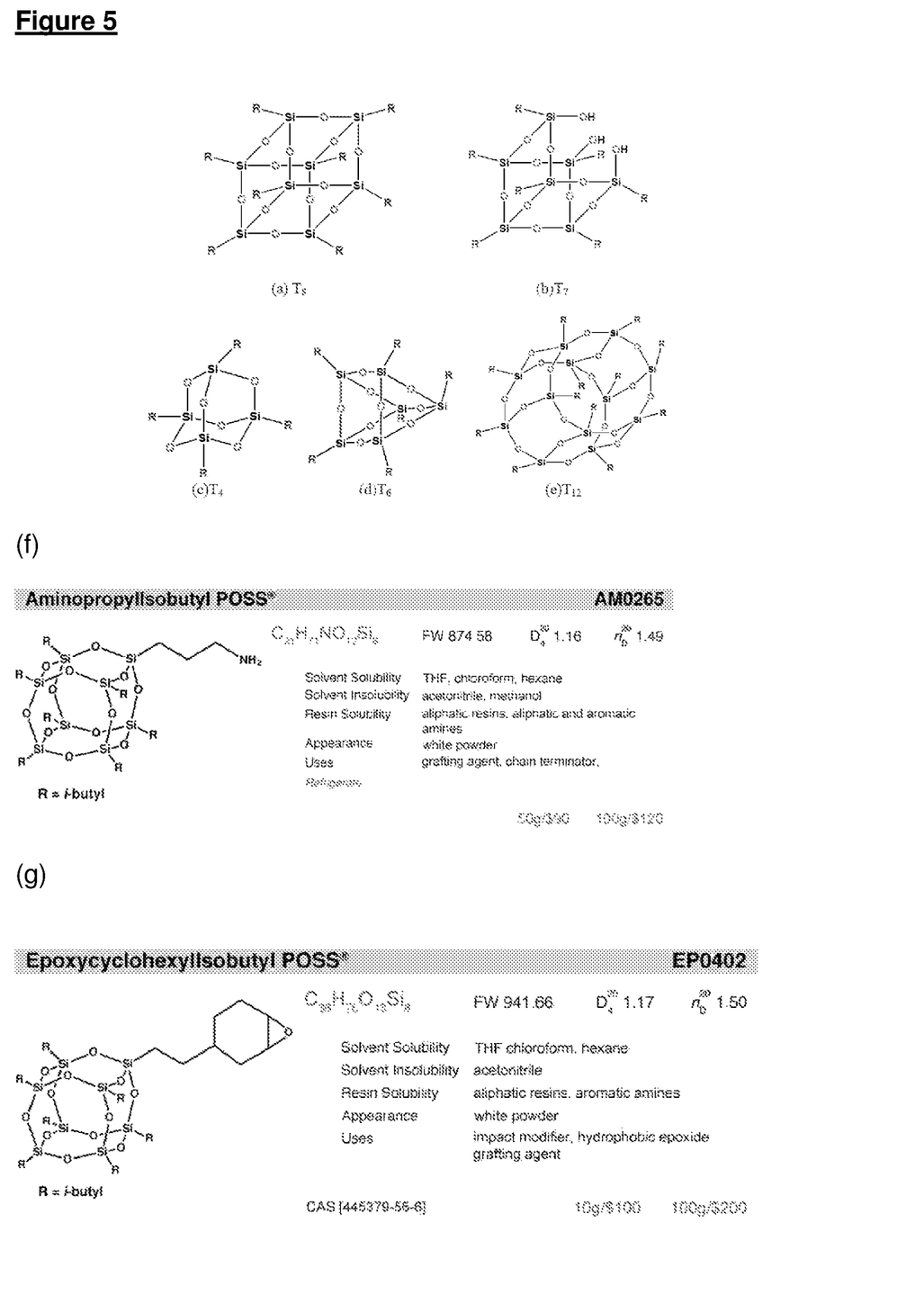
FIG. 5 shows various molecular structures of polyhedral oligomeric silsesquioxane (POSS) compounds with varying number of silicon atoms, i.e. (a) $T_8$, (b) $T_7$, (c) $T_4$, (d) $T_6$, (e) $T_{12}$, (f) aminopropylisobutyl (POSS)®, and (g) epoxycyclohexyisobutyl (POSS)®.

FIG. 5 shows a number of examples of suitable POSS compounds which may be added to the CFRP resin. As can be seen, the silicon atoms are located at the corners of the cage and therefore are at the surface of the basic cage structure. The silicon corners may be functionalized with a variety of organic substituents, including block copolymers, olefins, epoxides and biological molecules, such as peptides and carbohydrates.

In one embodiment, a preferred silsesquioxane may comprise aminopropylisobutyl (POSS)®, or a derivative or analogue thereof. The chemical formula of aminopropylisobutyl (POSS)® is $C_{31}H_{71}NO_{12}Si_8$, and its structure is shown in FIG. 5(f).

In another embodiment, a preferred silsesquioxane may comprise epoxycyclohexyisobutyl (POSS), or a derivative or analogue thereof. The chemical formula of epoxycyclohexyisobutyl (POSS)® is $C_{36}H_{76}O_{13}Si_8$, and its structure is shown in FIG. 5(g).

The CFRP resin may comprise between about 0.5 and 5 wt % silsesquioxane, or a derivative or analogue thereof. The inventors were very surprised however to observe that there is a "sweet-spot" at about 2% wt silsesquioxane at which there is only minimal water ingress into the CFRP article. Hence, the CFRP article, and preferably a polymeric resin thereof, may comprise about 1-4 wt %, or about 1-3 wt %, or about 1.5-2.5 wt %, or about 1.8-2.2 wt %, or about 1.9-2.1 wt %, or about 2 wt % silsesquioxane, or a derivative or analogue thereof. Derivatives and analogues of silsesquioxane may include ones that contain at least one co-reactant, e.g. epoxy, OH, $NH_2$ (see FIG. 5).

The reason for the 2% wt "sweet-spot" is not understood and was totally unexpected, and the inventors believe that this surprising observation forms an important feature of the invention.

Therefore, in a sixth aspect, there is provided a composition comprising a carbon fibre reinforced plastic (CFRP) and between about 0.5 to 5 wt % silsesquioxane, or a derivative or analogue thereof.

The composition may comprise about 1-4 wt %, or about 1-3 wt %, or about 1.5-2.5 wt %, or about 1.8-2.2 wt %, or about 1.9-2.1 wt %, or about 2 wt % silsesquioxane, or a derivative or analogue thereof. The silsesquioxane, or a derivative or analogue thereof, is preferably as defined above. Preferably, the silsesquioxane, or derivative or analogue thereof, is present in a resin, which is used to form a CFRP article, for example as defined herein.

The CFRP resin used to form the CFRP articles of the invention may be derived from a combination of Bisphenol A Diglycidyl ether (BADGE), and 2,2'-dimethyl-4,4'-methylene bis(cyclohexylamine). In another embodiment, the resin may be derived from a combination of Bisphenol A Diglycidyl ether (BADGE), Methyl Nadic anhydride, and 1-methyl imidazole.

In a seventh aspect, there is provided the use of a combination of a moisture barrier coating and a silsesquioxane, or a derivative or analogue thereof, for retarding water diffusion into and/or out of a CFRP resin.

Example 4 describes how the inventors have successfully increased electrical and thermal conductivity in CFRP articles. This was achieved by incorporating carbon nanotubes (CNT's) were added to the CFRP resin. Hence, the resin of the invention may comprise carbon nanotubes. The resin may comprise about 2 wt % carbon nanotubes. To date, although people have added CNTs into CFRP resin, no-one has achieved this in a manner that forms a good, uniform dispersion, and does not interfere with the operation of the resin. The inventors however have achieved this by functionalising the CNT's using —COOH acid (carboxylic acid) functionalisation, which allows the CNT's to disperse well into acidic resin.

In an eighth aspect, there is provided use of a combination of POSS and carbon nanotubes for increasing the electrical conductivity, thermal conductivity, thermal stability, and/or dimensional stability performance of CFRP.

It will be appreciated that the articles of the first and third aspects, and the composition of the sixth aspect may each comprise various combinations of the buffer layer (e.g. parylene D), moisture barrier coating (e.g. diamond-like carbon), silsesquioxane, or a derivative or analogue thereof (e.g. POSS), and/or carbon nanotubes. However, in a preferred embodiment, the articles and compositions of the invention comprise a buffer layer, a moisture barrier coating, a silsesquioxane, or a derivative or analogue thereof and carbon nanotubes.

It will be appreciated that the CFRP articles described herein exhibit enhanced thermal and dimensional stability, and improved electrical and thermal conductivity. This makes them highly suitable for use in a range of high performance applications, which would benefit from such characteristics, as well as the fact that the material is strong and very light.

Hence, in a ninth aspect, there is provided use of the CFRP article of the first or third aspect, or the composition of the sixth aspect, for the manufacture of a high-performance component.

In a tenth aspect, there is provided a high performance component comprising the CFRP article of the first or third aspect, or the composition of the sixth aspect.

Examples of high performance applications may include components for use in space or aerospace industries, high-performance terrestrial transportation, or in high-precision systems, such as telescopes or high-end sports equipment.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

EXAMPLES

With reference to FIG. 1a, carbon fibre reinforced polymer (CFRP) materials are used in many applications, for example the aerospace and space industry, but suffer the problem that it is sensitive to the absorption of moisture from the environment, and subsequent release of moisture (e.g. during space flight), and this gives rise to dimensional and weight instabilities. Furthermore, CFRP also experiences the problems of low out-of-plane electrical and thermal conductivities. The inventors have therefore investigated ways in which these problems can be solved either independently or simultaneously.

The invention described herein relates to the use of several approaches, which can be used either in combination or independently of one another, to reduce the rate of water absorption into the CFRP, and thereby reduce the amount of moisture that can transport in and out of the CFRP, and/or enhance the electrical and thermal conductivity. The first technology is the use of a moisture barrier coating (referred to herein as "MBC") around the CFRP component, and the second approach is the incorporation of a small amount of polyhedral oligomeric silsesquioxane (POSS) or a derivative or analogue thereof, into the resin that is used for producing the CFRP material.

Example 1

Increasing Dimensional and Weight Stabilities of CFRP

CFRP is known to suffer from dimensional instabilities caused by the effect that moisture has on CFRP components and articles. Moisture from the environment can diffuse deep into the CFRP resin matrix and locate at particular sites in the resin that can accommodate water molecules, and this can cause the CFRP to swell up. If the CFRP component is transported to an area with lower humidity (for example, into space or high altitude), the absorbed water can then diffuse away from the CFRP into the environment, for example into space. The release of this water causes a dimensional change to the CFRP component that may render the component unusable.

The objective of this example was to develop technologies to mitigate this problem, by reducing the extent of this transport of water into and out of the CFRP resin matrix. The inventors have addressed this problem with two solutions, as described in Examples 2 and 3.

Example 2

Encapsulate the CFRP Component in a Moisture-Barrier Coating (MBC)

The CFRP component is encapsulated in a thin-film coating that is a barrier to moisture. This reduces the speed of water transport, and therefore, the amount of water ingress into the CFRP during production and storage (as it is stored for a limited amount of time). The MBC also limits the speed at which water is released (e.g. during spaceflight), which would keep the component within the dimensional tolerance during the lifespan of the system (for example, a satellite in space). The CFRP material or component is intended to be coated with this MBC layer as soon as possible after its manufacture.

Despite the fact that there are many materials that are known to have good moisture barrier properties (for example, those used in the food packaging industry, aluminium foil, alumina, etc.), coating CFRP is significantly more complex, and it presents a unique challenge in itself, involving a specific methodology for the coating process. Indeed, this problem has been researched for a number of years, but numerous researchers have been unable to solve this problem. After a significant amount of inventive endeavour, the inventors have at last solved the problem, and the solution is non-trivial.

Figure 2:
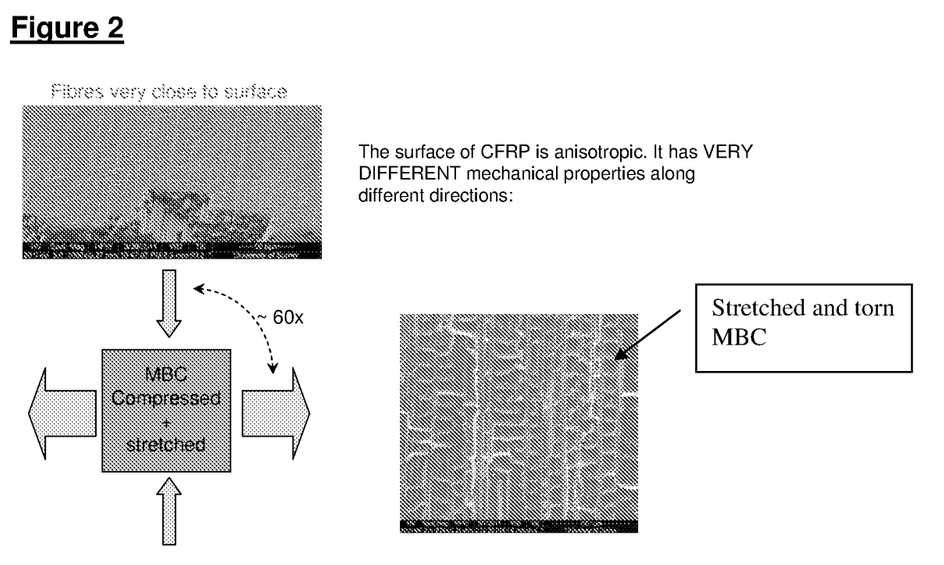
FIG. 2 illustrates the mechanism for mechanical failure of known moisture barrier coatings (MBC's) on CFRP when no buffer layer is present to accommodate mechanical stress deformations.

The reason for the complexity of coating CFRP with a MBC is the complex nature of its upper or outer surfaces, where the carbon fibres are aligned with each other in substantially one direction (FIG. 1b). Furthermore, the fibres and the resin matrix have very strong mechanical properties, which are in opposition with each other. For example, the carbon fibres have ~0 coefficient of thermal expansion (CTE), and sometimes a negative CTE, whereas the resin has some of the highest CTE values, i.e. ~60 parts per million (ppm). This severe mismatch of CTE's between the carbon fibres and the resin causes a highly dynamic surface on the CFRP component. In addition, since the fibres are aligned along substantially one single direction, the displacements also take place along one direction. The CTE values of commonly used MBC materials are in the range about 4-10 ppm. All of these mismatches cause the typical MBC materials to fail due to mechanical reasons, including stretching and tearing. Referring to FIG. 2, the failure mechanism of CFRP is illustrated. The surface of CFRP is generally anisotropic (i.e. directionally dependent), and so has very different mechanical properties in different directions.

In order to solve this problem, the inventors have developed a novel process where a 20 micrometer thick coating of parylene-D (acting as a buffer) is pre-deposited onto the CFRP component prior to the deposition of the moisture barrier coating consisting of diamond-like carbon (DLC). Parylene-D® is a known molecule (http://www.paratechcoating.co.uk/engineering-properties-of-parylene.asp), but it has never been used for coating CFRP for moisture barrier applications in conjunction with a barrier layer. It is a flexible layer that can be vacuum-deposited onto a substrate, and can accommodate the mechanical motions of the surface of the CFRP.

Parylene-D Coating

The process steps are as follow:—

1) The CFRP component is first cleaned with isopropanol (IPA) alcohol. This cleans any grease, dust and dirt etc. off the component;

2) The CFRP component is then inserted into a vacuum chamber and pumped to 1e-3 Torr;

3) Bis(Trimethylsilyl)amine (also known as hexamethyldisilazane, or HMDS) vapour is then injected into the chamber. HDMS has the molecular formula: $C_6H_{19}NSi_2$. It is an adhesion promoter and forms a monolayer on the surface of the CFRP. The process for application is in the manual of HMDS processes. In brief, the HMDS is fed into the chamber as a vapour and forms a monolayer on the surface by condensation (this process is proprietary information of the parylene deposition company);

4) Once the CFRP component has been contacted with HMDS, the chamber is then evacuated;

5) Parylene-D monomer is then introduced into the chamber. This is typically achieved by heating Parylene-D dimer in a separate chamber, and then subjecting it to pyrolysis in a furnace, and then injecting the resultant Parylene-D monomers into the coating vacuum chamber where the CFRP component is disposed, as shown in FIG. 3. The parylene monomer is carried along the tube in hydrogen or nitrogen or any other inert gas (argon, helium, etc); and the monomer polymerises on the surface forming parylene; and 6) After coating, the chamber is vented, and the parylene-coated component is then removed.

Diamond-Like Carbon (DLC) Coating

After deposition of parylene-D, a barrier film of diamond-like carbon (DLC) is then deposited over the parylene-D, which forms an MBC. The DLC that is deposited over the parylene-D is described in "Properties of Amorphous Carbon", Issue 29 of EMIS Datareviews Series, Editor S. R. P. Silva, 2003, ISBN 0852969619, 9780852969618. DLC is a vacuum-deposited form of carbon which is very hard, and has many carbon-carbon sp3 bonds, like those that are found in diamond. There are many different methods that can be used to deposit DLC, for example by a sputtering method, which is also known as physical vapour deposition (PVD). For example, see (http://www.diamonex.com/products/dlc-coatings/?gclid=CPv4nt2nsLMCFcrItAodKw 4ATA). In this method, the carbon source for the DLC is a solid form, and the coating is deposited in a way similar to a "spray process", which requires line-of-sight. However, this method may not be preferred for coating complex structures or inner bores of tubes with DLC.

The inventors deposited DLC onto the parylene-D coating by a plasma-enhanced chemical vapour deposition (PECVD) process, where the carbon source is a hydrocarbon gas, which is able to come into contact with all the surfaces of the component to be coated. The DLC coating can be summarised as follows:—

1) The parylene-coated component is inserted in a vacuum chamber;

2) The chamber is pumped down to pressures around 1e-3 Torr or lower;

3) A mixture of hydrogen and a hydrocarbon gas (e.g. methane, acetylene, etc) is bled into the chamber through a mass flow control (MFC) device. Typically, the hydrocarbon is diluted in the hydrogen to a concentration of around 1-20% (v/v), but it can be higher. Also, other gases such as argon, helium, nitrogen can be used.

4) The pressure of the chamber is regulated automatically by a computer-controlled valve to pressures in the rage of 50-1000 mTorr. Typically, pressures around 100-200 mTorr are used;

5) A plasma is then created in the chamber by applying a radio-frequency (RF) electric signal to the CFRP component. The frequency of the signal is typically 13.56 MHz, although other frequencies can be used. A DC signal can also be used. The RF signal is applied to the CFRP component via an RF matching unit;

6) The plasma has the effect of growing a DLC layer on top of the parylene-D. After the desired thickness is reached (about 10 nm-50 µm), the RF signal is switched off, the chamber purged and then vented to remove the coated CFRP component.

The unique aspect and advantage of this process is that the parylene-D/DLC coatings both need a vacuum chamber, and therefore, both layers can be deposited in a single chamber, without breaking the vacuum, which has not been carried out before. The inventors have demonstrated surprisingly efficient moisture barrier performance from CFRP components that have been coated with parylene/DLC structures. It is also possible to multiply the performance of the barrier by depositing many parylene/DLC multilayers, and this can be achieved in a single process run, which is also a novel finding.

The performance of the MBC is measured by placing coated and non-coated CFRP samples in an environmental chamber that has been set at high humidity conditions. The samples are weighed at time intervals after exposure to the moist environment, and the weight gain (by moisture ingression) after exposure to moisture is calculated registered as a percentage of the sample's weight before the exposure measurement. The data are shown in FIG. 4. As can be seen, the figure shows an initial gain of weight (as water penetrates into the material), then the weight levels out after exposure of several hours, as is typical from a diffusion process. However, the figure shows that the coated samples gain weight more slowly than the un-coated (reference) samples, which demonstrates that the coatings clearly act as retardants (or barriers) for the ingression of water into the CFRP.

Example 3

Addition of POSS to CFRP Resin

The inventors have developed another way to reduce the extent of water or moisture transport into and out of the CFRP resin matrix, and that is by adding polyhedral oligomeric silsesquioxane (POSS) or a derivative or analogue thereof, into the resin. The POSS molecules blend into the resin, and occupy the sites where the water molecules would normally reside in the resin. The addition of POSS therefore leaves fewer vacant sites for the water molecules, and the result is that the resin can absorb less water. This solution can be used either on its own, or in conjunction with the moisture barrier coating (MBC) to obtain enhanced performance.

Referring to FIG. 5, there is shown a number of examples of cage-like POSS compounds that can be used. Materials derived from POSS molecules exhibit enhanced properties by bridging the property space between organic substituent and inorganic silsesquioxane materials. For example, the specific functionalities on a POSS molecule impart unique thermal, mechanical, electrical, rheological, solubility, and diffusivity properties to materials, rendering them as very useful candidates for high-temperature spacecraft coatings, in electronics packaging and low dielectric constant materials. The POSS compound that is used is different for different types of CFRP resin, and this allows tailoring the chemistry of the POSS to suit the chemistry of the resin system. The inventors have exemplified two resin systems, which are amongst the most common types of resins used in CFRP manufacture. Below is the process for mixing the POSS into these resins.

Resin System 1:
1) Bisphenol A Diglycidyl ether (BADGE), purchased from Haas Group International, UK;
2) 2,2'-dimethyl-4,4'-methylene bis(cyclohexylamine) purchased from Sigma-Aldrich; and
3) Aminopropylisobutyl POSS (AM0265) purchased from Hybrid Plastics, USA.

Mixing ratio (parts by weight):
BADGE: 100
Amine: 34
AM0265: Varies depending on percentage weight incorporation.

AM0265 was first dissolved in minimal amounts of THF before adding BADGE. This was then heated to 50° C. on a heating plate and stirred with a magnetic stirrer for 1 hour. To this, the amine curing agent was then added and stirred for another 30 minutes or until all the solvent had evaporated. The resulting mixture was then cured in the oven for 3 hours at 60° C. and 4 hours at 130° C.

Resis System 2:
1) Bisphenol A Diglycidyl ether (BADGE) purchased from Haas Group International, UK;
2) Methyl Nadic anhydride purchased from Haas Group International, UK;
3) i-methyl imidazole purchased from Sigma-Aldrich; and
4) Epoxycyclohexyisobutyl POSS (EP0402) purchased from Hybrid Plastics, USA.

Mixing ratio (parts by weight):
BADGE: 100
Anhydride: 95
Imidazole: 0.5-2
EP0402: Varies depending on percentage weight incorporation EP0402 was first dissolved in minimal amounts of THF before adding the anhydride and imidazole. This was then heated at 80° C. on a heating plate and stirred with a magnetic stirrer for 2 hours. To this, the BADGE was then added and stirred for another 5 minutes until a homogenous mixture is formed. The resulting mixture was then cured in the oven for 2 hours at 120° C. and 8 hours at 160° C.

Figure 6:
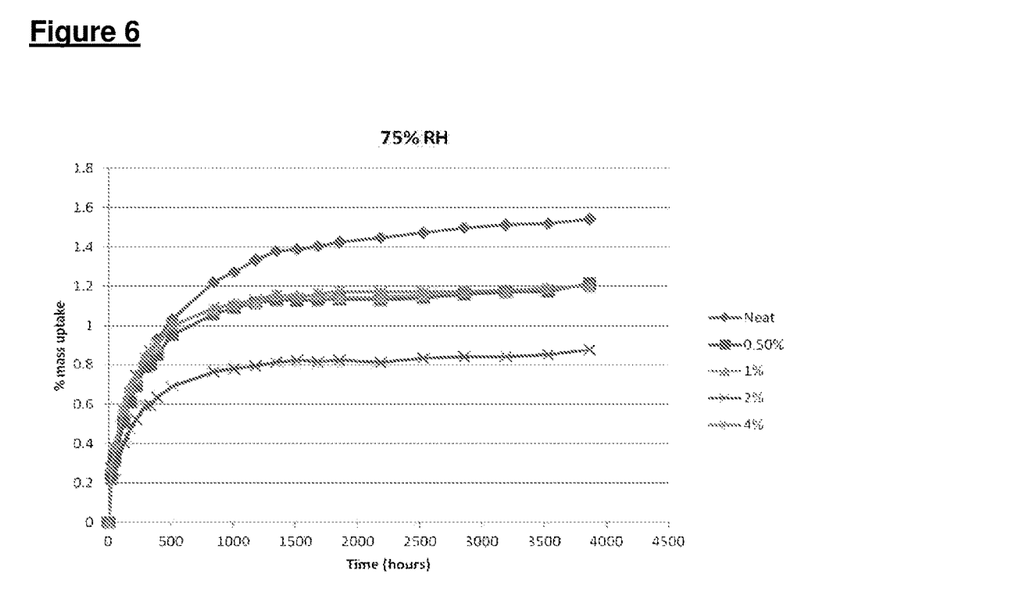
FIG. 6 is a graph showing water absorption at an accelerated rate (70° C., 85% RH relative humidity at room temperature)

In order to determine the optimum concentration of POSS to be added to the resin, a range of different POSS concentrations were tested (i.e. 0%, 0.5%, 1%, 2%, and 4% w/v). With reference to FIG. 6, testing the resin/POSS mixtures for moisture uptake (by measuring the % weight uptake in a 75% humidity environment) clearly showed that the POSS-containing samples absorbed less water than the neat resin samples (i.e. 0% (w/v) POSS). When 0.5%, 1% or 4% (w/v) POSS was added to the resin, water absorption performance was improved. However, the inventors were very surprised to observe that there is a "sweet-spot" at about 2% (w/v) POSS incorporation at which there is only minimal water ingress. The reason for this 2% (w/v) "sweet-spot" is not understood as was an unexpected result.

Furthermore, it was observed that as well as resulting in a lower moisture uptake, the addition of POSS to the resin also lead to an increase in the thermal performance of the resins. Differential scanning calorimetry (DSC) experiments were carried out, and the data are summarised in Table 1, which show the benefits of adding POSS into the epoxy matrix system.

TABLE 1

Glass transition temperatures for L20 resin with AM0265 (i.e. POSS compound)

| POSS concentration in resin | Glass transition ($T_g$) |
| --- | --- |
| 0 wt % (i.e. Neat 'diamine' resin) | 123 |
| 0.5 wt % | 146 |
| 1 wt % | 148 |
| 2 wt-% | 170 |
| 4 wt-% | 164 |

The DSC data show the varying glass transition temperatures of the individual resins with the different percentages of POSS incorporation. Even at low POSS concentrations (0.5% wt), there is a significant improvement in $T_g$ ranging from 23-47° C. when compared with the neat resin (0% wt POSS). This was also an unexpected result.

Example 4

Increasing Electrical and Thermal Conductivity in CFRP

Experiments to increase the out-of-plane thermal and electrical conductivity of the CFRP were focused at increasing the thermal and electrical conductivity of the resin. In order to achieve this, carbon nanotubes (CNT's) were added to the resin as an additive. CNTs have high levels of thermal conduction (better than diamond) and electrical conductivity (better than silver), and do not form surface oxides, or rust. This makes them ideal for combining with CFRP materials and their resins. Although people have added CNTs into the resin in CFRP, to date, no-one has previously done this in a manner that forms a good, uniform dispersion, and does not interfere with the operation of the resin.

Obtaining a good dispersion of CNT's in a CFRP resin is important to the usability of the CNT mixture, especially when making mixtures in large amounts. In order to improve their dispersion, the inventors have functionalised the nanotubes using —COOH acid (carboxylic acid) functionalisation, which allows the CNT's to disperse well into acidic resin. The usual method for producing acid functionalised CNT's is by treating them with acid prior mixing with the resin. However, this has been found to cause damage to the nanotubes. Therefore, in order to overcome this problem, the inventors have used plasma-functionalised CNT's. These are carboxylic acid (COOH) functionalised nanotubes. They are purchased from a company, but this type of functionalisation (carboxylic acid) is known e.g. http://www.sigmaaldrich.com/catalog/product/aldrich/652490?lang=en&region=GB)

Figure 7:
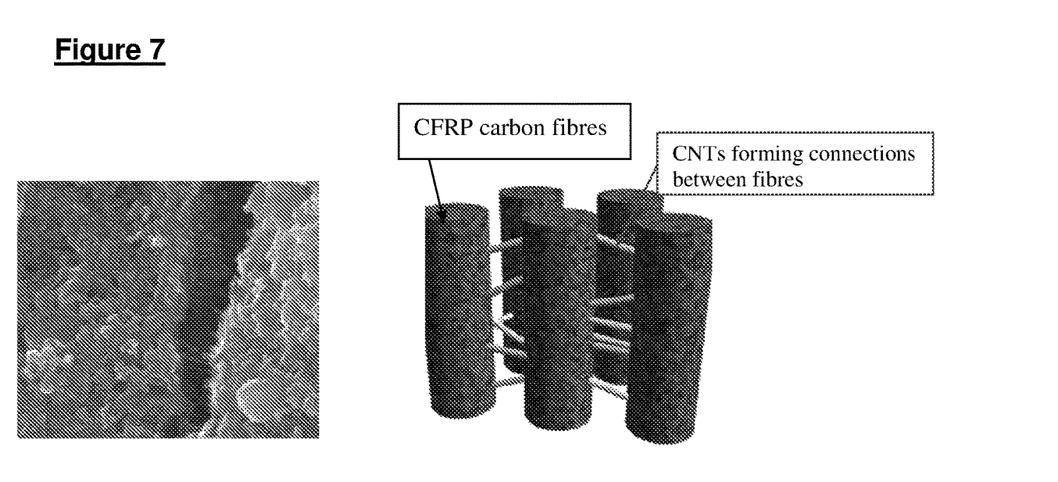
FIG. 7 illustrates carbon nanotubes (CNT's) incorporated in the resin matrix. Right: schematic of CNTs "bridging" electricity and heat flow across adjacent fibres.

Referring to FIG. 7, there is shown 1-5 wt % CNT's dispersed in the resin. The CNTs create bridges for electricity and heat flow across adjacent resin fibres. A crack in the resin reveals the thin nanotubes (left). The inventors have obtained CFRP that is electrically conducting out-of-plane (~200 Ohmcm). Also, they have achieved an increase in the thermal conductivity of the neat resin by a factor of ×2.5.

Example 5

Measuring the Weight Gain of a Set of CFRP Samples Placed in a Humidity Chamber as a Function of Time An experiment was devised to measure the affect of the MBC in reducing the extent of water or moisture transport into and out of the CFRP resin matrix. A set of CFRP samples were placed in an environmental chamber (also known as a humidity chamber) set at 70° C. and 70% relative humidity and the weight gain was measured as a function of time. The weight gain corresponds to the moisture absorption of the samples.

The test conditions were selected to accelerate the rate of moisture transport into and out of the CFRP resin matrix as opposed to leaving the samples in normal ambient conditions. This meant the samples could be analysed over 2250 hours of testing in the selected conditions rather than having to be analysed over a year or more which would have been necessary if the samples had been left in ambient conditions.

FIG. 8 compares the weight gain of an uncoated CFRP sample compared to a number of MBC samples with various barrier layers when placed in the environment chamber for 2250 hours. It will be understood that the two barrier layer composition is CFRP/ParyleneD/DLC/ParyleneD/DLC/ParyleneD where the two barrier layers are the DLC layers, sandwiched between the parylene-D layers which provide mechanical coupling. The MBC samples range from two barrier DLC layers to five barrier DLC layers.

The results clearly show that all the coated samples absorb less moisture and have a lower rate of moisture transport into the CFRP resin matrix than the uncoated reference sample. Additionally, the samples with a larger number of DLC layers absorb less moisture and have a lower rate of moisture transport into the CFRP resin matrix than the samples with fewer DLC layers. This shows that the performing characteristics of the MBC increase with the number of DLC layers.

SUMMARY

The inventors have successfully produced a CFRP material, which exhibits dimensional stability. This has been achieved by producing a CFRP material, which has been coated with a parylene-D buffer and then a moisture-barrier coating (diamond-like carbon) and a 2% wt POSS additive in the resin. The observation was that moisture ingression/release from the CFRP has been eliminated, thereby increasing the dimensional stability. Furthermore, the inventors have added carbon nanotubes in combination with the POSS (and in some embodiments parylene-D and DLC) into the CFRP, and this significantly enhanced the electrical conductivity, thermal conductivity, onset of thermal degradation (thermal stability), and dimensional stability performance of the CFRP. The inventors have shown that the combined use of a moisture barrier coating, carbon nanotubes additive and POSS additive into CFRP results in the enhancement of the electrical conductivity, thermal conductivity, onset of thermal degradation (thermal stability), and dimensional stability performance of CFRP.

The invention claimed is:

1. An article comprising:
   (i) a carbon fibre reinforced plastic (CFRP) substrate, wherein the CFRP substrate comprises a resin matrix system with a reinforcement comprising carbon fibres, aligned with each other in substantially one direction, disposed therein, wherein the reinforcement does not comprise a particulate dispersion,
   (ii) a buffer layer disposed adjacent the CFRP substrate, and comprising a poly(para-xylylene) polymer; and
   (iii) a moisture barrier coating comprising diamond-like carbon disposed adjacent the buffer layer.

2. The article according to claim 1, wherein the poly(para-xylylene) polymer is represented by the formula I, as follows:

wherein R1, R2 and R3 are independently selected from the group consisting of hydrogen and a halogen, and wherein n is greater than 2.

3. The article according to claim 1, wherein the article comprises more than one buffer layer comprising poly(para-xylylene) polymer.

4. The article according to claim 3, wherein the thickness of each buffer layer is about 0.1-1000 μm.

5. The article according to claim 1, wherein the article comprises a plurality of buffer layers and moisture barrier coatings alternatively disposed, such that the plurality of the plurality of buffer layers and moisture barrier coatings can be identified by general formula (I):

$$[BL:MBC]_n \qquad (I)$$

wherein BL corresponds to a buffer layer, MBC corresponds to a moisture barrier coating, and n is greater than 1.

6. The article according to claim 1, wherein the article comprises silsesquioxane, or a derivative or analogue thereof.

7. The article according to claim 6, wherein the silsesquioxane, or a derivative or analogue thereof is represented by a general formula $(R-SiO_{1.5})_n$, wherein n is an even number, and R is hydrogen, or a hydroxyl or alkoxy group, or an optionally substituted straight or branched alkyl, alkylene, aryl or arylene group.

8. The article according to claim 6, wherein the silsesquioxane comprises a polyhedral oligomeric silsesquioxane.

9. The article according to claim 6, wherein the silsesquioxane comprises aminopropylisobutyl polyhedral oligomeric silsesquioxane, or a derivative or analogue thereof.

10. The article according to claim 6, wherein the silsesquioxane comprises epoxycyclohexylisobutyl polyhedral oligomeric silsesquioxane, or a derivative or analogue thereof.

11. The article according to claim 6, wherein the CFRP substrate comprises between about 0.5 and 5 wt % silsesquioxane, or a derivative or analogue thereof.

12. The article according to claim 1 comprising carbon nanotubes.

13. A method of manufacturing an article comprising a carbon fibre reinforced plastic (CFRP), the method comprising:
    (i) providing a CFRP substrate comprising a resin matrix system with a reinforcement comprising carbon fibres, aligned with each other in substantially one direction, wherein the reinforcement does not comprise a particulate dispersion;

(ii) depositing a buffer layer comprising a poly(paraxylylene) polymer on the CFRP substrate; and (iii) depositing a moisture barrier coating comprising diamond-like carbon on the buffer layer.

* * * * *

UNITED STATES PATENT AND TRADEMARK OFFICE
CERTIFICATE OF CORRECTION

PATENT NO. : 10,550,232 B2
APPLICATION NO. : 14/775902
DATED : February 4, 2020
INVENTOR(S) : Jose Virgilio Anguita Rodriguez et al.

It is certified that error appears in the above-identified patent and that said Letters Patent is hereby corrected as shown below:

On the Title Page

Item (30), Foreign Application Priority Data, Line 1, delete "March 7, 2014" and insert --March 14, 2013--, thereof.

Signed and Sealed this
Twenty-sixth Day of May, 2020

Andrei Iancu
*Director of the United States Patent and Trademark Office*